United States Patent
Gustafsson

(10) Patent No.: US 7,769,826 B2
(45) Date of Patent: Aug. 3, 2010

(54) SYSTEMS AND METHODS OF PROVIDING DNS SERVICES USING SEPARATE ANSWER AND REFERRAL CACHES

(75) Inventor: Andreas Gustafsson, Redwood City, CA (US)

(73) Assignee: Nominum, Inc., Redwood City, CA (US)

( * ) Notice: Subject to any disclaimer, the term of this patent is extended or adjusted under 35 U.S.C. 154(b) by 1473 days.

(21) Appl. No.: 10/608,724

(22) Filed: Jun. 26, 2003

(65) Prior Publication Data

US 2004/0267907 A1 Dec. 30, 2004

(51) Int. Cl.
*G06F 15/16* (2006.01)

(52) U.S. Cl. .................. 709/219; 711/119; 711/122; 709/216; 709/217; 709/218

(58) Field of Classification Search ......... 709/216–219; 711/122
See application file for complete search history.

(56) References Cited

U.S. PATENT DOCUMENTS

| | | | |
|---|---|---|---|
| 5,860,146 A * | 1/1999 | Vishin et al. ............... 711/207 |
| 5,875,461 A * | 2/1999 | Lindholm .................. 711/118 |
| 6,182,136 B1 * | 1/2001 | Ramanathan et al. ....... 709/224 |
| 6,244,758 B1 * | 6/2001 | Solymar et al. ............ 709/224 |
| 6,789,156 B1 * | 9/2004 | Waldspurger ............... 711/6 |
| 6,834,302 B1 | 12/2004 | Harvell |
| 2002/0143984 A1 * | 10/2002 | Hudson et al. ............. 709/238 |
| 2002/0161745 A1 * | 10/2002 | Call ........................... 707/1 |
| 2002/0178238 A1 * | 11/2002 | Fletcher et al. ............. 709/220 |
| 2003/0009591 A1 | 1/2003 | Hayball et al. |
| 2003/0074461 A1 | 4/2003 | Kang et al. |
| 2004/0003113 A1 * | 1/2004 | Keohane et al. ............ 709/245 |
| 2004/0013113 A1 * | 1/2004 | Singh et al. ................ 370/389 |
| 2004/0139086 A1 * | 7/2004 | Hasenau .................... 707/100 |
| 2004/0148301 A1 | 7/2004 | McKay et al. |
| 2005/0015374 A1 | 1/2005 | Reinauer et al. |
| 2005/0044242 A1 * | 2/2005 | Stevens et al. ............. 709/228 |
| 2005/0114367 A1 | 5/2005 | Serebrennikov |
| 2005/0141485 A1 | 6/2005 | Miyajima et al. |
| 2006/0101026 A1 | 5/2006 | Fukushima |

OTHER PUBLICATIONS

Mockapetris, "Domain Names—Concepts and Facilities," Network Working Group, Nov. 1987, STD 13, RFC 1034, located at http://www.ietf.org/rfc/rfc1034.txt.
Mockapetris, "Domain Names—Implementation and Specification," Network Working Group, Nov. 1987, STD 13, RFC 1035, located at http://www.ietf.org/rfc/rfc1035.txt.

* cited by examiner

*Primary Examiner*—Hetul Patel
(74) *Attorney, Agent, or Firm*—Gard & Kaslow LLP

(57) ABSTRACT

Systems and methods of determining DNS information, such as an IP address, associated with a domain name. The methods using a cache segregated to store various domain name system (DNS) data in different data structures. The data structures are configured for minimization of data retrieval times. In some embodiments, answer information is stored in a hash table. In these and other embodiments, times required to search for answers are essentially constant as a function of the number of labels comprising the domain name.

35 Claims, 3 Drawing Sheets

SYSTEMS AND METHODS OF PROVIDING DNS SERVICES USING SEPARATE ANSWER AND REFERRAL CACHES

BACKGROUND

1. Field of the Invention

The invention is in the field of computer science and specifically in the field of network communications.

2. Prior Art

The Internet is a network of computing systems configured to communicate with each other. Communication is accomplished using a system of unique numerical addresses such as Internet Protocol (IP) addresses. However, computing systems connected to the internet are also addressable using "domain names" such as www.nominum.com. When a domain name is used to specify a location on the internet, the domain name is translated (i.e., "resolved") into the IP address of that location by the Domain Name System (DNS). The DNS also stores other types of information that may be looked up by domain name, such as information for routing electronic mail.

An Internet domain name contains a hierarchy of labels, conventionally separated by dots. For example, the domain name www.nominum.com is part of the "nominum.com" domain, which in turn is a subdomain of the "com" domain, which is a subdomain of the "root domain." The root domain can be viewed as a parent domain of "com," which in turn is a parent domain of "nominum.com," etcetera. Other valid addresses defined under the nominum.com domain may include, for example, "products.nominum.com" or "sales.nominum.com." Often a domain name is used in conjunction with directory or file information to form a Universal Resource Locator (URL) associated with a specific file (e.g., www.nominum.com/main/products.html).

Information to be looked up in the DNS is stored in servers referred to as "authoritative servers." An authoritative server stores the information pertaining to a particular domain, exclusive of any subdomains that have been delegated to their own authoritative servers. Additionally, servers that are authoritative for a parent domain store information identifying servers authoritative for its delegated subdomains, for use in referring information requests.

When a domain name is entered at a client computer, the client computer typically queries a local "caching server" which resolves the name into an IP address or other desired DNS information on the client's behalf and then returns the information to the client. This caching server may, for example, be managed by a local internet service provider.

The caching server resolves names by querying one or more authoritative servers. For example, to resolve the name "www.nominum.com," a typical caching server may first query one of the servers authoritative for the root domain, which responds with a "referral response" identifying the servers authoritative for the "com" domain. The caching server then queries one of the servers authoritative for the "com" domain, which responds with another referral response identifying the servers authoritative for the "nominum.com" domain. Finally, the caching server queries one of the servers authoritative for the "nominum.com" domain, which responds with an "answer response" containing the desired information regarding www.nominum.com.

The caching server also includes a cache of information previously received from authoritative servers as a result of past queries, so as to improve efficiency by avoiding repeated queries. Typically, cache data are stored in a tree structure such that navigating the cache starting from a root node yields either the desired answer or, when the answer is not present, identifies the closest parent domain for which cached information identifying its authoritative servers is present, allowing that information to serve as a starting point for the process of querying authoritative servers as described above. In a typical cache, information from both answer responses and referral responses is stored in the same tree structure. When the cache data are stored in a tree structure, a search of the cache can be accomplished in a time that grows in proportion to the number of labels in the domain name being translated.

A caching server may process thousands of queries per second and search a cache including hundreds of megabytes of data. There is, therefore, a need for systems and methods that improve the efficiency of the translation of domain names to DNS data, such as IP addresses.

SUMMARY OF THE INVENTION

The invention includes a caching server having a segregated cache. The segregation is configured such that referral information and answer information are stored in different data structures, each data structure having advantages with regard to finding data of these particular types. In some embodiments, answer information is stored in a flat data structure configured such that these data can be located using efficient look-up techniques, while referral information is stored in a tree based data structure reflecting the hierarchical nature of these data. Some embodiments of the invention include methods of determining DNS information from an associated domain name, the determination including searching the data structure including the answer information prior to searching the data structure including the referral information. In various embodiments of the invention the determined DNS information includes IP addresses, mail exchange information (MX records), or other data defined within DNS standards. (See, for example, Mockapetris, P., "Domain Names—Concepts and Facilities," STD 13, RFC 1034, November 1987. http://www.ietf.org/rfc/rfc1034.txt, and Mockapetris, P., "Domain Names—Implementation and Specification," STD 13, RFC 1035, November 1987. http://www.ietf.org/rfc/rfc1035.txt, incorporated herein by reference.)

Various embodiments of the invention include a caching server comprising an answer cache configured to access answer information through a flat data structure, a referral cache configured to store referral information, and computer instructions configured to determine DNS information by examining the answer cache and, responsive to the results of examining the answer cache, examining the referral cache.

Various embodiments of the invention include a computer readable medium having stored thereupon computer code configured for determining DNS information associated with a domain name, the computer code comprising a code segment configured for receiving a request for the DNS information corresponding to a domain name, a code segment configured for examining a first cache to find the DNS information, the first cache including a flat data structure and configured to store the DNS information or a pointer to the DNS information, and a code segment configured to initiate a search of a second cache if the DNS information is not found by examining the first cache, the second cache configured to store data referring to further locations on a computer network wherein the DNS information may be found.

Various embodiments of the invention include a computer network comprising means for receiving a request for DNS information corresponding to a domain name, means for examining a first cache to find the DNS information, the first cache configured to store the DNS information or a pointer to the DNS information, and means for searching a second cache if the DNS information is not found by examining the first cache, the second cache configured to store data referring to further locations on the computer network wherein the DNS information may be found.

Various embodiments of the invention include a computer network comprising a computing system configured to access a component of the computer network using a domain name, and a caching server including a cache configured for translating the domain name into DNS information defined within the DNS standards such as an IP address MX record set, or the like, and means for examining the cache in a time that remains essentially constant regardless of the number of labels comprising the domain name being translated and the size of the cache.

Various embodiments of the invention include a method of determining DNS information, the method comprising receiving a request for DNS information corresponding to a domain name, and examining an answer cache for answer information, the answer cache including a hash table configured to store the answer information, and preferably not including a tree data structure.

Various embodiments of the invention include a method of determining DNS information, the method comprising receiving a request for an DNS information corresponding to a domain name, examining an answer cache to find answer information, the answer cache including a flat data structure, and responsive to the examination of the answer cache, searching a referral cache.

Various embodiments of the invention include a method of storing data in a cache, the method comprising requesting DNS information, receiving data in response to the request, classifying the data received as an answer or a referral, storing the data received in either a referral cache or an answer cache, selection between the referral cache and the answer cache being response to the classification.

Various embodiments of the invention include a method of caching DNS information, the method comprising requesting DNS information, receiving data in response to requesting DNS information, classifying the data received as an answer or a referral, storing the data received in either a referral cache or an answer cache based on the classification, the answer cache including a flat data structure, receiving a request for DNS information corresponding to a domain name, examining the answer cache to find answer information, and responsive to the examination of the answer cache, searching the referral cache.

In various embodiments of the invention the DNS information includes, an IP address, MX record set, or other data of a data type defined by DNS standards.

BRIEF DESCRIPTION OF THE VARIOUS VIEWS OF THE DRAWING

DETAILED DESCRIPTION OF THE INVENTION

The invention includes systems and methods of translating a domain name into DNS information such as IP addresses, MX records, or other DNS data types. In various embodiments, the invention includes one or more caching servers each having a segregated cache divided into an answer cache and a referral cache. The answer cache is configured to store answer information such as domain names and associated IP addresses. The referral cache is configured to store referral information including referrals to authoritative servers. The answer information stored in the answer cache is stored in a flat data structure, such as a hash table. The referral information stored in the referral cache are stored in a tree based or other hierarchical data structure.

In a typical method of the invention the one or more caching servers respond to a query by first searching the answer cache for cached answer information. Because information can be found in a hash table in a time approximately independent of the size of the hash table, this first search typically takes less time than a corresponding search on a tree based data structure. If desired DNS information is found in the search of the answer cache, then this result is returned to the requester. If the desired DNS information is not found in the search of the answer cache, then the referral cache is searched for an appropriate referral to an authoritative server. Because the search of the answer cache generally has a high probability of success, this method typically results in translation of a domain name into associated DNS information more quickly than methods of the prior art.

Figure 1:
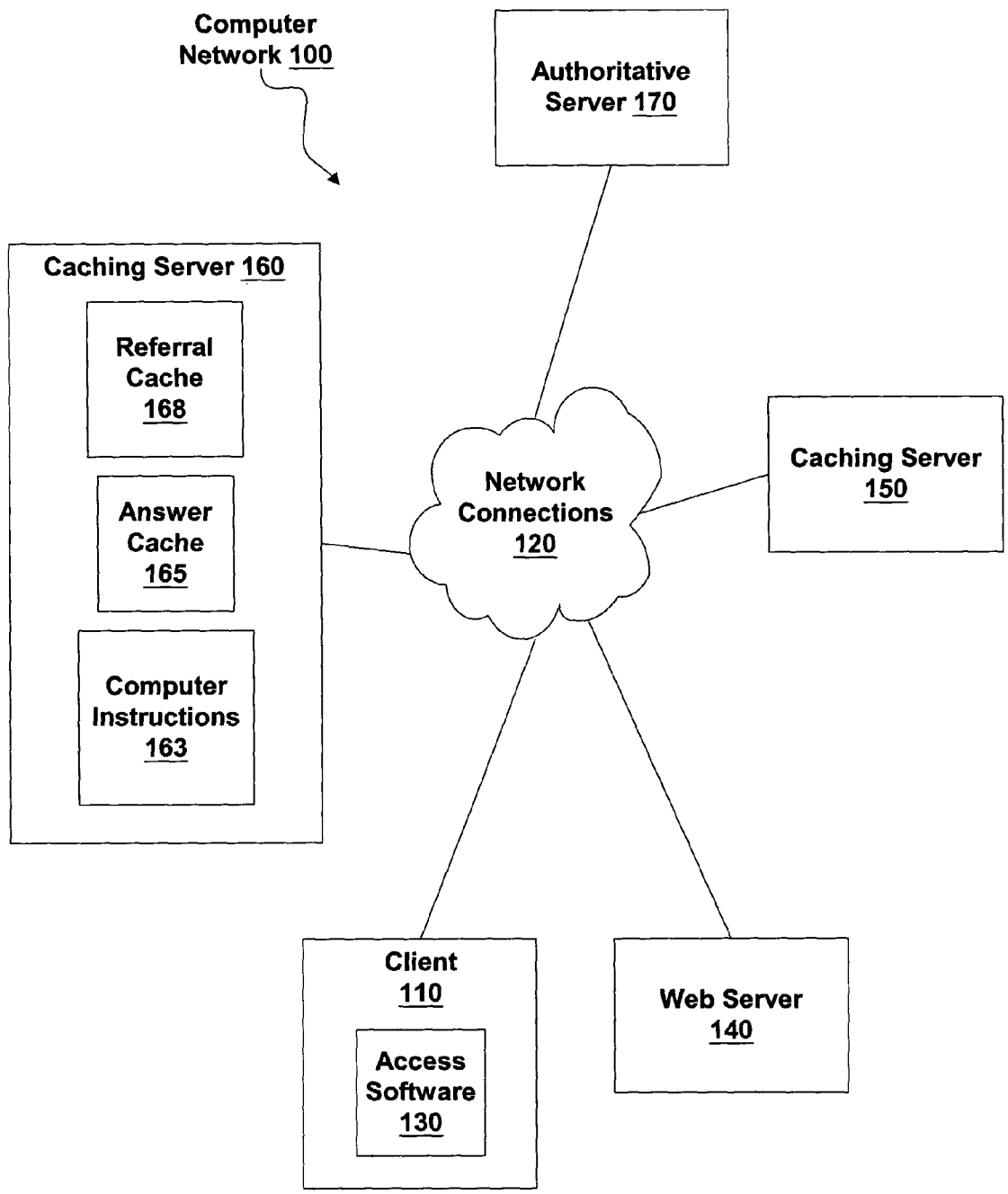
FIG. 1 is a block diagram of a computer network according to various embodiments of the invention.

FIG. 1 is a block diagram of a DNS based computer network, such as the Internet and generally designated 100, according to various embodiments of the invention. Computer Network 100 includes a Client 110 configured for a user to access other computing systems through Network Connections 120. Client 110 is, for example, a personal computing device, internet telephone, internet enabled appliance, wireless access device, local computer network, or the like. In various embodiments, Network Connections 120 includes the communications channels configured to support the Internet, a wide area network, a telephone network, or other internet protocol based communications system.

Client 110 includes Access Software 130 configured to identify and access a network location, such as Web Server 140, using a domain name. For example, in some embodiments Access Software 130 is an internet browser configured to receive a domain name from a user. Access Software 130 is optionally distributed between Client 110 and other local computing devices. When provided with a domain name, Access Software 130 is configured to determine DNS information, such as an IP address, by querying other components of Computer Network 100. For example, in a typical embodiment, Client 110 will query a prior art Caching Server 150 or a Caching Server 160 for an IP address corresponding to the domain name. Caching Server 160 includes Computer Instructions 163 configured to receive the query, determine a query result and further perform steps to determine the IP address.

Typically, Computer Instructions 163 are configured to first look for answer information in an Answer Cache 165 for DNS information associated with the domain name. Answer Cache 165 is configured to include a flat table, such as a hash table. In embodiments wherein Answer Cache 165 is a hash table, a time required to look for the answer information remains essentially constant as a function of the number of labels in the domain name being translated and the size of Answer Cache 165. In some embodiments the time required to look for the answer information is approximately independent of the size of Answer Cache 165.

If the desired DNS information is found in Answer Cache 165 then this DNS information is returned to Client 110.

Otherwise, Computer Instructions 163 are configured to next look in Referral Cache 168 for referral information referring to other components of Computer Network 100 that may have information leading to the desired DNS information. Referral Cache 168 typically includes data stored in a tree data structure. The referral information may refer to one or more Authoritative Server 170. In some embodiments, Caching Server 160 is also an Authoritative Server 170, including authoritative IP address data, or a Web server 140.

Figure 2:
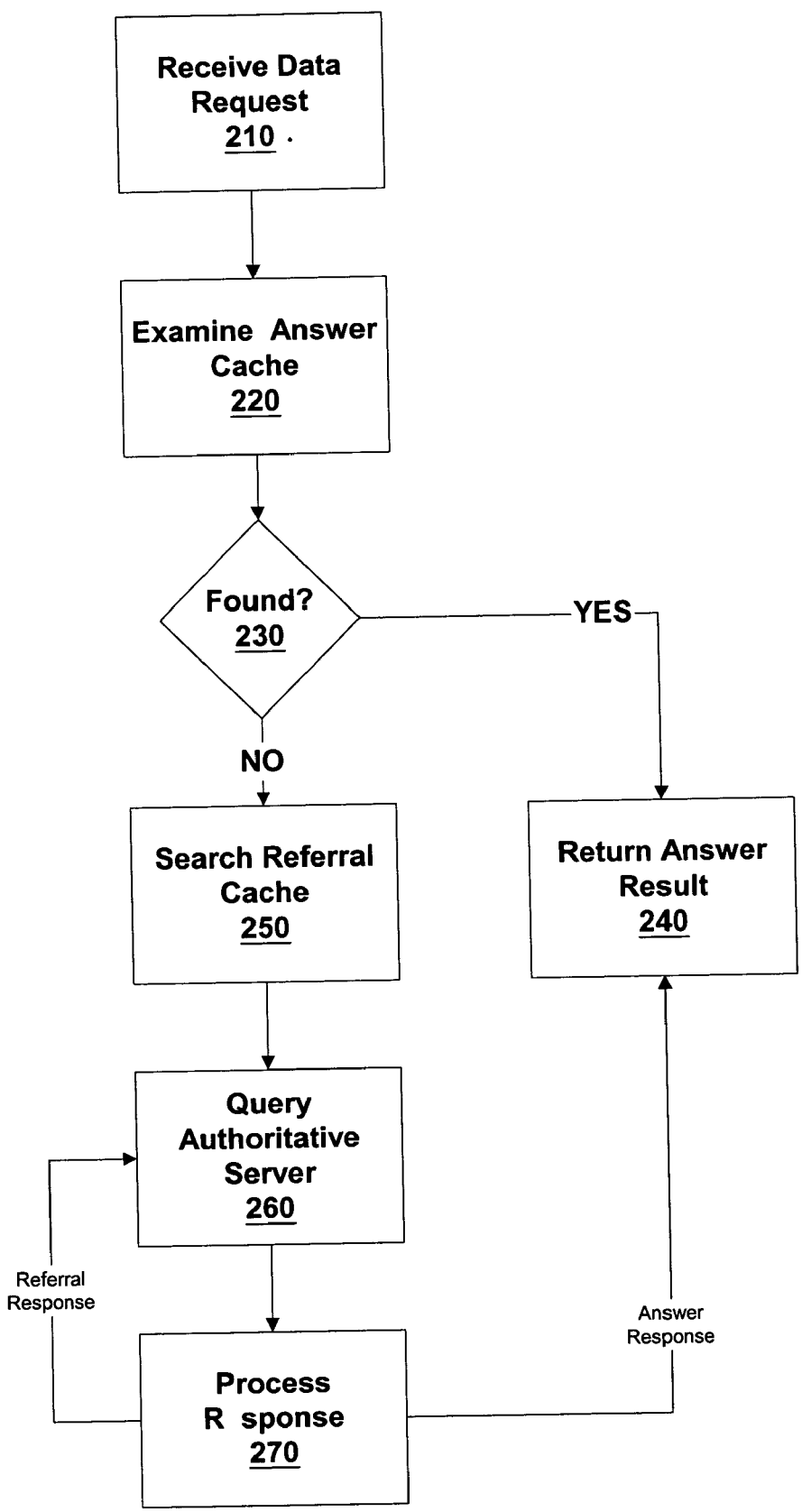
FIG. 2 illustrates a method of responding to a request for DNS information associated with a specific domain name, according to various embodiments of the invention.

FIG. 2 illustrates a method of responding to a request for DNS information, such as an MX record or IP address, associated with a specific domain name, according to various embodiments of the invention. In this method, Computer Instructions 163 are used to first look in Answer Cache 165 for answer information corresponding to the specific domain name. If the desired DNS information is found, then the result is returned to the requestor. If the desired DNS information is not found, then Referral Cache 168 is searched for a referral to another Authoritative Server 170.

More specifically, in some embodiments, Caching Server 160 receives a request for an IP address, or other DNS information, corresponding to a specific domain name, in a Receive Data Request Step 210. This request is typically received from Client 110 or from some other component of Computer Network 100. The request includes the specific domain name, for which the associated DNS information is desired, and a type of the DNS information expected. This type is optionally an IP address, MX record, or the like.

In an Examine Answer Cache Step 220, Computer Instructions 163 are used to look in Answer Cache 165 for the desired DNS information. In embodiments wherein Answer Cache 165 includes a hash table, the time required for the examination is approximately independent of the size of Answer Cache 165 and of a number of labels in the specified domain name.

In a Found Step 230, Computer Instructions 163 determine if the desired DNS information was found in Examine Answer Cache Step 220. If so, then the method proceeds to a Return Answer Result Step 240 wherein the found DNS information is returned to Client 110. If not, then the method proceeds to a Search Referral Cache Step 250.

In Search Referral Cache Step 250, Computer Instructions 163 initiate a search of Referral Cache 168 for referral information referring to one or more Authoritative Server 170 and associated with the domain name to be translated to DNS information. This search is configured to identify referral information associated with the parent domain name, available in the cache, that is closest to the domain name to be translated. Typically, this search includes navigation within a tree data structure used to store the referral information.

In a Query Authoritative Server Step 260, Computer Instructions 163 use the referral information found in Search Referral Cache Step 250 to query an authoritative server, such as Authoritative Sever 170, that is referred to in the referral information. In a Process Response Step 270, a response is received from the queried authoritative server. If the response includes answer information then the answer is returned to the original requestor, such as Client 110. If the response does not include an answer, but instead includes one or more referrals, then Process Response Step 270 is followed by a return to Query Authoritative Server Step 260 wherein one of the one or more referrals is used to query another authoritative server.

Figure 3:
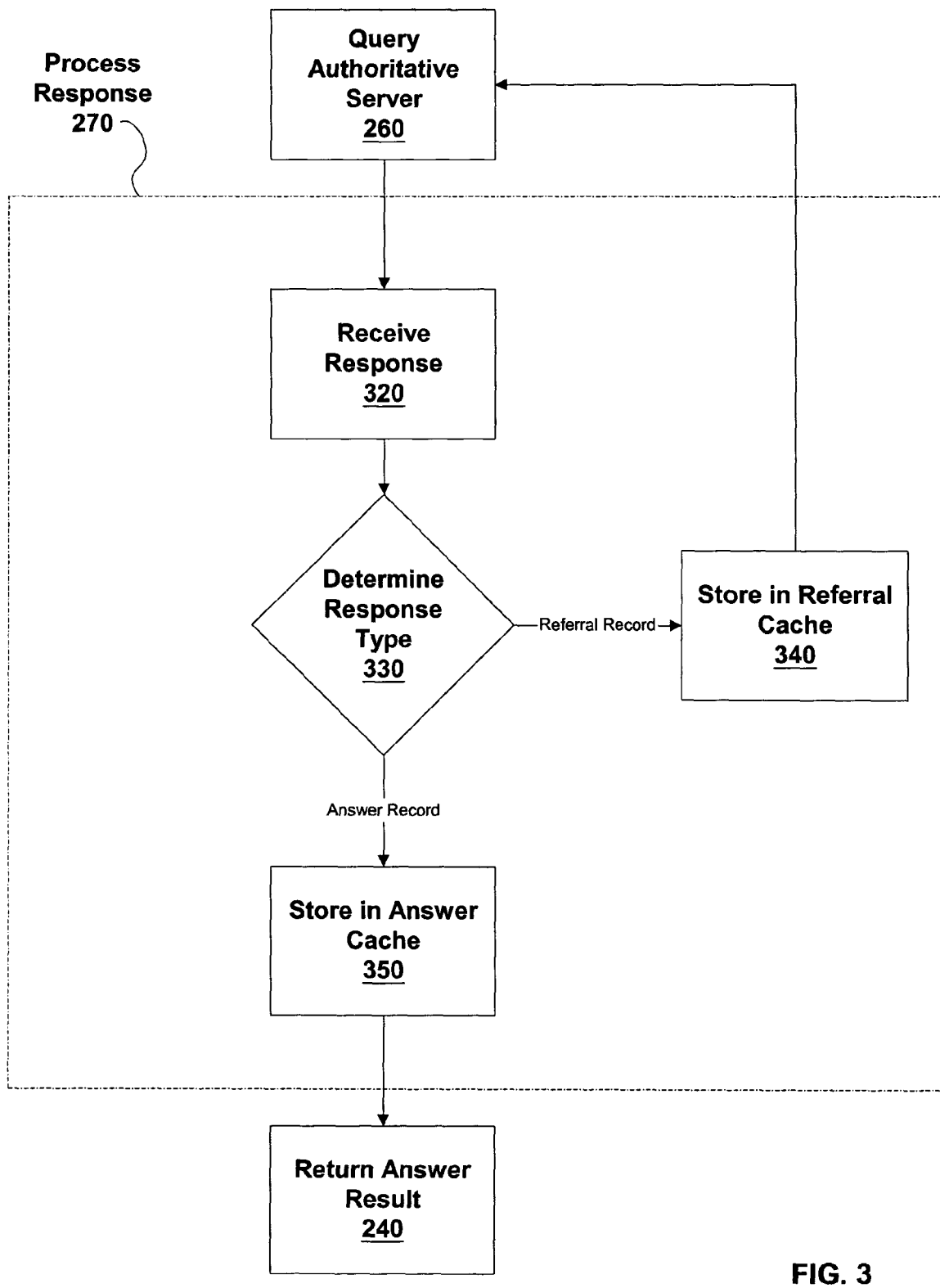
FIG. 3 illustrates methods of developing a referral cache and an answer cache, according to various embodiments of the invention.

FIG. 3 illustrates further details of Process Response Step 270 including methods of developing Referral Cache 168 and Answer Cache 165, using data received by Caching Server 160, according to various embodiments of the invention. In these methods, answer information and referral information is received by Caching Server 160 in response to requests for DNS information associated with domain names, such as the request made in Query Authoritative Server Step 260. The received information is stored in Referral Cache 168 or Answer Cache 165 responsive to classification of the received information as being an answer response or a referral response.

Specifically, in a Query Authoritative Server Step 260, Caching Server 160 requests DNS information associated with a specific domain name. This request includes the specific domain name and is made to an authoritative server, such as Authoritative Server 170. For example, in some embodiments Caching Server 160 uses a previously received referral information to identify and query Authoritative Server 170.

In a Receive Response Step 320, included in various embodiments of Process Response Step 270, Caching Server 160 receives a response to the request made in, for example, Query Authoritative Server Step 260. This response typically includes data such as answer information, referral information, error information, or the like. In a Determine Response Type Step 330, Computer Instructions 163 determine the type of response received in Receive Response Step 320. If the response is a referral response, then the method proceeds to a Store in Referral Cache Step 340. If the type is an answer response, then the method proceeds to a Store in Answer Cache Step 350.

In Store in Referral Cache Step 340 the data received in Receive Response Step 320 is stored in Referral Cache 168. In some embodiments, this storage includes navigation of a tree data structure and addition of a node in the tree to store the received data. Following Store in Referral Cache Step 340, the method typically returns to Query Authoritative Server Step 260, wherein the referral received in Receive Response Step 320 is used to make another request for the DNS information.

In Store in Answer Cache Step 350, the data received in Receive Response Step 320 is stored in Answer Cache 165. In some embodiments, this step includes insertion of the received data into a hash table. Following Store in Answer Cache Step 350, the method optionally proceeds to a Return Answer Result Step 240 in which the DNS information received in Receive Response Step 320 is returned to the original requestor (e.g., Client 110).

Several embodiments are specifically illustrated and/or described herein. However, it will be appreciated that modifications and variations are covered by the above teachings and within the scope of the appended claims without departing from the spirit and intended scope thereof. For example, in some embodiments, an original request for DNS information may arise from components of Computer Network 100 other than Client 110. In these embodiments the result is returned to the requestor rather than Client 110.

In another example, in some embodiments, the flat data structure of Answer Cache 165 includes pointers (e.g. index values or memory addresses, etcetera) to an other data structure in place of answer information. In these embodiments, the other data structure is optionally included in Referral Cache 168 and Referral Cache 168 includes both referral and answer information. When Answer Cache 165 includes pointers to an other data structure, answer information is found by examining Answer Cache 165 and then using a pointer found in Answer Cache 165 to access associated answer information within the other data structure. In these embodiments, the answer cache is configured such that the answer information is accessed through a flat data structure including the pointers.

In another example, in some embodiments, the referral cache includes pointers to referral information stored in an other data structure. In some of these embodiments both the answer cache and referral cache include pointers. These pointers optionally point to answer information and referral information stored together.

In typical embodiments described herein, elements of the invention may optionally return an error rather then requested DNS information defined within DNS standards. It is expected that systems and methods of the invention will be applied to new DNS data types as they are defined by DNS standards.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

I claim:

1. A caching server comprising:
   an answer cache configured to access answer information through a flat data structure;
   a referral cache configured to store referral information; and
   computer instructions configured to translate a domain name into DNS information by examining the answer cache in a time that is essentially constant as a function of a number of labels comprising the domain name and essentially constant as a function of a size of the answer cache and, responsive to the results of examining the answer cache, examining the referral cache.

2. The caching server of claim 1, wherein the flat data structure is a hash table.

3. The caching server of claim 1, wherein the flat data structure includes pointers to a tree data structure.

4. The caching server of claim 1, wherein the flat data structure includes pointers to a tree data structure, and the tree data structure is configured to store answer information and referral information.

5. The caching server of claim 1, wherein the flat data structure includes pointers to a tree data structure, and the tree data structure is included in the referral cache.

6. The caching server of claim 1, wherein the caching server is also an authoritative server.

7. The caching server of claim 1, wherein the caching server is also a web server.

8. The caching server of claim 1, wherein the referral cache is further configured to store the referral information in a hierarchical data structure.

9. The caching server of claim 1, wherein the DNS information includes an IP address.

10. The caching server of claim 1, wherein the DNS information includes an MX record.

11. The caching server of claim 1, wherein the referral cache is separate from the answer cache.

12. A computer readable medium having stored thereupon computer code configured to determine DNS information associated with a domain name, the computer code comprising:

a code segment configured to receive a request for the DNS information corresponding to a domain name;
   a code segment configured to examine a first cache to find the DNS information, the first cache including a flat data structure and configured to store the DNS information or a pointer to the DNS information; and
   a code segment configured to initiate a search of a second cache if the DNS information is not found by examining the first cache, the second cache configured to store data referring to further locations on a computer network wherein the DNS information may be found.

13. The computer readable medium of claim 12, wherein the DNS information includes an IP address.

14. A computer network comprising:
   means for receiving a request for DNS information corresponding to a domain name;
   means for examining a first cache to find the DNS information, the first cache configured to store the DNS information or a pointer to the DNS information; and
   means for searching a second cache if the DNS information is not found by examining the first cache, the second cache configured to store data referring to further locations on the computer network wherein the DNS information may be found.

15. The computer network of claim 14, further including means for storing data in the first cache such that a time required to examine the first cache is essentially constant as a function of a number of labels comprising the domain name.

16. The computer network of claim 15, wherein the DNS information includes an IP address.

17. The computer network of claim 14, further including means for storing data in the first cache such that a time required to examine the first cache is essentially constant as a function of a size of the first cache.

18. A computer network comprising:
   a computing system configured to access a component of the computer network using a domain name;
   a caching server including a first data structure configured for translating the domain name into DNS information, and means for examining the first data structure in a time that is essentially constant as a function of a number of labels comprising the domain name; and
   a second data structure configured for translating the domain name into DNS information.

19. The computer network of claim 18, wherein the DNS information includes an IP address or an MX record.

20. A method of determining DNS information, the method comprising:
   receiving a request for DNS information corresponding to a domain name;
   examining an answer cache for answer information, the answer cache including a hash table configured to store the answer information or to store a pointer to the answer information; and
   searching a tree data structure if the DNS information is not found by examining the answer cache.

21. The method of claim 20, wherein the hash table is configured to store the pointer to the answer information.

22. The method of claim 20, wherein the answer cache does not include a tree data structure.

23. The method of claim 20, wherein the tree data structure is configured to store referral data and is included in a referral cache.

24. The method of claim 20, wherein the tree data structure is configured to store pointers to referral data.

25. The method of claim 20, wherein the DNS information includes an IP address.

26. The method of claim 20, wherein the hash table is configured to store the answer information.

27. A method of determining DNS information, the method comprising:

receiving a request for DNS information corresponding to a domain name;

examining an answer cache to find answer information, responsive to the received request, the answer cache including a flat data structure, wherein a time required to examine the answer cache is essentially constant as a function of a number of labels comprising the domain name and essentially constant as a function of a size of the answer cache; and responsive to the examination of the answer cache, searching a referral cache.

28. The method of claim 27 wherein the flat data structure is configured to store the answer information.

29. The method of claim 27, wherein the flat data structure is configured to store a pointer to the answer information.

30. The method of claim 27, wherein the flat data structure is a hash table.

31. The method of claim 27, wherein the referral cache includes a hierarchical data structure.

32. The method of claim 27, wherein the DNS information includes an IP address.

33. A method of caching DNS information, the method comprising:

requesting DNS information;

receiving data in response to requesting DNS information;

classifying the response received as an answer response or a referral response;

storing the response received in either a referral cache or an answer cache based on the classification, the answer cache including a flat data structure;

receiving a request for DNS information corresponding to a domain name;

examining the answer cache to find answer information, responsive to the received request, wherein a time required to examine the answer cache is essentially constant as a function of a number of labels comprising the domain name and essentially constant as a function of a size of the answer cache; and responsive to the examination of the answer cache, searching the referral cache.

34. The method of claim 33, wherein the referral cache includes a hierarchical data structure.

35. The method of claim 33, wherein the received request for DNS information includes a request for an IP address.

\* \* \* \* \*